(12) United States Patent
Akamatsu

(10) Patent No.: US 6,713,668 B2
(45) Date of Patent: *Mar. 30, 2004

(54) SOLAR ENERGY CONVERTER AND SOLAR ENERGY CONVERSION SYSTEM

(76) Inventor: Norio Akamatsu, Jyosanjima-jyutaku 2-105, 9-2, Nakajyosanjimacho 2-chome, Tokushima-shi, Tokushima 770-0813 (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/152,845

(22) Filed: May 23, 2002

(65) Prior Publication Data

US 2003/0111104 A1 Jun. 19, 2003

(30) Foreign Application Priority Data

Dec. 14, 2001 (JP) ........................................ 2001-381915

(51) Int. Cl.⁷ ................................................ H02N 3/00
(52) U.S. Cl. ...................... 136/205; 136/206; 136/215; 136/216; 136/224; 136/246; 136/259; 136/253; 310/300; 310/306; 310/308; 313/523; 313/524; 313/539; 313/542
(58) Field of Search ............................... 136/205, 206, 136/215, 216, 224, 246, 259, 253; 310/300, 306, 308; 313/523, 524, 539, 542

(56) References Cited

U.S. PATENT DOCUMENTS

| | | | |
|---|---|---|---|
| 3,328,611 A | | 6/1967 | Davis |
| 3,477,012 A | | 11/1969 | Laing |
| 4,168,716 A | * | 9/1979 | Fowler et al. ............... 136/206 |
| 4,257,823 A | * | 3/1981 | Bevilacqua et al. ......... 136/206 |
| 4,363,989 A | | 12/1982 | Johnson |
| 5,028,835 A | * | 7/1991 | Fitzpatrick ................... 313/14 |
| 6,037,697 A | | 3/2000 | Begg et al. |
| 6,064,137 A | | 5/2000 | Cox |

FOREIGN PATENT DOCUMENTS

| | | | |
|---|---|---|---|
| EP | 989576 A1 | * | 3/2000 |
| EP | 1 117 118 A1 | | 7/2001 |
| JP | 4-152229 A | * | 5/1992 |
| WO | WO-02/13366 A1 | * | 2/2002 |
| WO | WO-02/13367 A1 | * | 2/2002 |

OTHER PUBLICATIONS

Forbes, R. G.: "Low–macroscopic–field Electron Emission from carbon films and other electrically nanostructured heterogeneous materials: Hypotheses about emission mechanism", *Solid State Electronics*, Elsevier Science Publishers, Barking, GB, vol. 45, Nr. 6, pp. 779–808, ISSN 0038–1101 (2001).

* cited by examiner

*Primary Examiner*—Alan Diamond
(74) *Attorney, Agent, or Firm*—Oliff & Berridge, PLC

(57) ABSTRACT

A solar energy converter includes: a light-concentrating instrument; an electron emitter in an insulated vacuum vessel, emitting electrons in a vacuum as a temperature rises by sunlight; an electron accelerator within the light-concentrating instrument; a cathode on a surface of the electron emitter opposite to a surface which is irradiated by sunlight, and electrically connected with the electron emitter; an electric field supplier having a positive terminal and a negative terminal; and an electron collector in the vacuum vessel, collecting the emitted electrons flying from the electron emitter toward the electron accelerator; wherein the electron accelerator is connected with the positive terminal and the cathode is connected with the negative terminal to generate an electric field, and the electron collector is used as a negative generator electrode and the cathode is used as a positive generator electrode in which the collected electrons migrate to the electron emitter to generate electricity.

17 Claims, 10 Drawing Sheets

SOLAR ENERGY CONVERTER AND SOLAR ENERGY CONVERSION SYSTEM

BACKGROUND OF THE INVENTION

1. Field of the Invention

The present invention relates to a solar energy converter that converts solar energy emitted from the sun into electric energy and a solar energy conversion system.

2. Description of Related Art

Conventionally, the energy from sources such as thermal power, hydroelectric power and nuclear power, for example, an electric generation system like a rotating electric generator in which conductors are rotated in a magnetic field to force electrons to migrate to generate electricity has been employed so far. Moreover, photovoltaic batteries, comprising semiconductors and widely known as a method of converting solar energy, attracted attention as clean electric energy.

However, there is no guarantee that the use of thermal power generation, hydroelectric power generation and nuclear power generation will provide a stable supply of electricity in the long run as a method of generating electric energy, due to the exhaustion of the resources and limited amount of supply. Moreover, in conventional photovoltaic batteries, the energy conversion efficiency is bad and not practical since the sunlight which can be used by the solar cell is only a part of the spectra of light currently emitted from the sun. Therefore, the cost-performance does not reach a level of practical use.

SUMMARY OF THE INVENTION

The present invention was developed to overcome the drawbacks noted in the preceding paragraph. It offers a more efficient solar energy conversion system as it transforms solar energy into electric energy, utilizing the wavelength domain of the sunlight corresponding to abroad spectra of light emitted from the sun, and will stably supply electric energy over the long term.

According to the first aspect of the present invention, a solar energy converter comprises:

- a light-concentrating instrument for concentrating sunlight;
- an electron emitter in an insulated vacuum vessel, emitting electrons in a vacuum as a temperature rises from irradiation of the sunlight concentrated by said light-concentrating instrument;
- an electron accelerator within said light-concentrating instrument;
- a cathode on a surface of said electron emitter opposite to a light-irradiated surface which is irradiated by the sunlight, and electrically connected with said electron emitter;
- an electric field supplier having a positive terminal and a negative terminal; and
- an electron collector in said vacuum vessel, collecting the emitted electrons flying from said electron emitter toward said electron accelerator,
- wherein said electron accelerator is connected with the positive terminal of said electric field supplier and said cathode is connected with the negative terminal of said electric field supplier so that an electric field is generated, and said electron collector is used as a negative generator electrode and said cathode is used as a positive generator electrode in which the collected electrons in said electron collector migrate to said electron emitter to generate electricity.

According to the solar energy converter, the electron accelerator is connected with the positive terminal of the electric field supplier and the cathode is connected with the negative terminal of the electric field supplier to generate electric field, the temperature of the electron emitter rises from irradiation of sunlight concentrated by the light-concentrating instrument, and therefore the electron emitter emits electrons into a vacuum. The electron collector collects the emitted electrons and has an excess of electrons. The excessive electrons in the electron collector migrate to the electron emitter lacking electrons through the cathode, and thereby electricity is generated. In this manner, the solar energy converter can convert solar energy concentrated by the light-concentrating instrument into electric energy.

Specifically, the inside of the solar energy converter is kept as a vacuum by using the vacuum vessel, so that there is almost no energy loss that is caused by conduction to the outside or the like. Therefore, electric power generation can be achieved with high efficiency.

Further, since the electron accelerator is provided within the light-concentrating instrument, the electrons emitted from the electron emitter are absorbed in the electron collector without reaching the electron accelerator. Still further, since the electron accelerator is placed within an insulated material, the emitted electrons hardly migrate to the electron accelerator. Therefore, there is almost no leakage-current flow from the electron accelerator and almost no energy loss in this part.

According to the second aspect of the present invention, a solar energy converter comprises:

- a light-concentrating instrument for concentrating sunlight;
- an electron emitter in an insulated and sealed vessel filled with inert gas, emitting electrons into space as a temperature rises from irradiation of the sunlight concentrated by said light-concentrating instrument;
- an electron accelerator within said light-concentrating instrument;
- a cathode on a surface of said electron emitter opposite to a light-irradiated surface which is irradiated by the sunlight, and electrically connected with said electron emitter;
- an electric field supplier having a positive terminal and a negative terminal; and
- an electron collector in said insulated and sealed vessel filled with the inert gas, collecting the emitted electrons flying from said electron emitter toward said electron accelerator,
- wherein said electron accelerator is connected with the positive terminal of said electric field supplier and said cathode is connected with the negative terminal of said electric field supplier so that an electric field is generated, and said electron collector is used as a negative generator electrode and said cathode is used as a positive generator electrode in which the collected electrons in said electron collector migrate to said electron emitter to generate electricity.

According to the solar energy converter, the electron accelerator is connected with the positive terminal of the electric field supplier and the cathode is connected with the negative terminal of the electric field supplier to generate electric field, the temperature of the electron emitter rises from irradiation of sunlight concentrated by the light-concentrating instrument, and therefore the electron emitter emits electrons into space. The electron collector collects the emitted electrons and has an excess of electrons. The excessive electrons in the electron collector migrate to the electron emitter lacking electrons through the cathode, and thereby electricity is generated. In this manner, the solar energy converter can convert solar energy concentrated by the light-concentrating instrument into electric energy.

Specifically, since the inside of the solar energy converter is kept full with inert gas by using the sealed vessel, the electron emission efficiency of the electron emitter is preferable. Therefore, the electrons can migrate more efficiently.

Further, since the electron accelerator is provided within the light-concentrating instrument, the electrons emitted from the electron emitter are absorbed in the electron collector without reaching the electron accelerator. Still further, since the electron accelerator is placed within an insulated material, the emitted electrons hardly migrate to the electron accelerator. Therefore, there is almost no leakage-current flow from the electron accelerator and almost no energy loss in this part.

According to the third aspect of the invention, a solar energy converter comprises:

a light-concentrating instrument for concentrating sunlight;

an electron emitter in an insulated vacuum vessel, emitting electrons in a vacuum as a temperature rises from irradiation of the sunlight concentrated by said light-concentrating instrument;

an electron accelerator within said light-concentrating instrument;

a substrate on a surface of said electron emitter opposite to a light-irradiated surface which is irradiated by the sunlight, and electrically connected with said electron emitter;

an electric field supplier having a positive terminal and a negative terminal;

an electron collector in said vacuum vessel, collecting the emitted electrons flying from said electron emitter toward said electron accelerator; and a cathode on a surface of said substrate opposite to a touching surface which touches said electron emitter, wherein said electron accelerator is connected with the positive terminal of said electric field supplier and said cathode is connected with the negative terminal of said electric field supplier so that an electric field is generated, and said electron collector is used as a negative generator electrode and said substrate is used as a positive generator electrode in which the collected electrons in said electron collector migrate to said electron emitter to generate electricity.

According to the solar energy converter, the electron accelerator is connected with the positive terminal of the electric field supplier and the cathode is connected with the negative terminal of the electric field supplier to generate the electric field, the temperature of the electron emitter rises from irradiation of sunlight concentrated by the light-concentrating instrument, and therefore the electron emitter emits electrons into a vacuum. The electron collector collects the emitted electrons and has an excess of electrons. The excessive electrons in the electron collector migrate to the electron emitter lacking electrons through the cathode, and thereby electricity is generated. In this manner, the solar energy converter can convert solar energy concentrated by the light-concentrating instrument into electric energy.

Specifically, the inside of the solar energy converter is kept as a vacuum by using the vacuum vessel, so that there is almost no energy loss that is caused by conduction to the outside or the like. Therefore, electric power generation can be achieved with high efficiency.

Further, since the electron accelerator is provided within the light-concentrating instrument, the electrons emitted from the electron emitter are absorbed in the electron collector without reaching the electron accelerator. Still further, since the electron accelerator is placed within an insulated material, the emitted electrons hardly migrate to the electron accelerator. Therefore, there is almost no leakage-current flow from the electron accelerator and almost no energy loss in this part.

According to the fourth aspect of the invention, a solar energy converter comprises:

a light-concentrating instrument for concentrating sunlight;

an electron emitter in an insulated and sealed vessel filled with inert gas, emitting electrons into space as a temperature rises from irradiation of the sunlight concentrated by said light-concentrating instrument;

an electron accelerator within said light-concentrating instrument;

a substrate on a surface of said electron emitter opposite to a light-irradiated surface which is irradiated by sunlight, and electrically connected with said electron emitter;

an electric field supplier having a positive terminal and a negative terminal;

an electron collector in said insulated and sealed vessel filled with the inert gas, collecting the emitted electrons flying from said electron emitter toward said electron accelerator; and a cathode provided on a surface of said substrate opposite to a touching surface which touches said electron emitter, wherein said electron accelerator is connected with the positive terminal of said electric field supplier and said cathode is connected with the negative terminal of said electric field supplier so that an electric field is generated, and said electron collector is used as a negative generator electrode and said cathode is used as a positive generator electrode in which the collected electrons in said electron collector migrate to said electron emitter to generate electricity.

According to the solar energy converter, the electron accelerator is connected with the positive terminal of the electric field supplier and the cathode is connected with the negative terminal of the electric field supplier to generate electric field, the temperature of the electron emitter rises from irradiation of sunlight concentrated by the light-concentrating instrument, and therefore the electron emitter emits electrons into space. The electron collector collects the emitted electrons and has an excess of electrons. The excessive electrons in the electron collector migrate to the electron emitter lacking electrons through the substrate. In this manner, the solar energy converter can convert solar energy concentrated by the light-concentrating instrument into electric energy.

Specifically, since the inside of the solar energy converter is kept full with inert gas by using the sealed vessel, the electron emission efficiency of the electron emitter is preferable. Therefore, the electrons can migrate more efficiently.

Further, since the electron accelerator is provided within the light-concentrating instrument, the electrons emitted from the electron emitter are absorbed in the electron collector without reaching the electron accelerator. Still further, since the electron accelerator is placed within an insulated material, the emitted electrons hardly migrate to the electron accelerator. Therefore, there is almost no leakage-current flow from the electron accelerator and almost no energy loss in this part.

In the above-mentioned solar energy converter, the insulated material may be sandwiched between the cathode and the substrate.

According to this type of solar energy converter, since the insulated material is sandwiched between the cathode and the substrate to insulate the cathode from the substrate, current hardly flows. Therefore, there is almost no energy loss.

In the above-mentioned solar energy converter, the substrate may comprise a tetravalent element.

According to this type of solar energy converter, since the substrate comprises a tetravalent element such as silicon or a carbonaceous material, the substrate can efficiently function as a conductive material.

In the above-mentioned solar energy converter, the substrate may comprise a tetravalent element containing a predetermined amount of either a trivalent element or a pentavalent element.

According to this type of solar energy converter, the substrate comprises a tetravalent element containing the predetermined amount of either a trivalent element or a pentavalent element, and the trivalent element or pentavalent element becomes a carrier contributing to electric conduction. Therefore, the electric conductivity of the substrate is increased, the energy loss caused by its resistance is decreased, and thereby the efficiency of the solar energy conversion can be improved.

In the above-mentioned solar energy converter, the cathode may comprise a tetravalent element.

According to this type of solar energy converter, since the cathode comprises a tetravalent element such as silicon or a carbonaceous material, the substrate, the positive electrode of the solar energy converter, can efficiently function as a conductive material.

In the above-mentioned solar energy converter, the cathode may comprise a tetravalent element containing a predetermined amount of either a trivalent element or a pentavalent element.

According to this type of solar energy converter, the cathode comprises a tetravalent element containing a predetermined amount of either a trivalent element or a pentavalent element, and the trivalent element or pentavalent element becomes a carrier contributing to electric conduction. Therefore, the electric conductivity of the cathode is increased, the energy loss caused by its resistance is decreased, and thereby the efficiency of the solar energy conversion can be improved.

In the above-mentioned solar energy converter, the electron emitter may comprise carbon.

According to this type of solar energy converter, the electron emitter is a material comprising carbon. The material is not a special one with limited availability or a high production cost. This is because it is not necessary to mix impurities with the material. Further, the carbon material does not cause the destruction of the environment. Therefore, the solar energy converter does not affect the environment even if it is used on a large scale.

In the above-mentioned solar energy converter, the electron emitter may comprise a substance having diamond-crystal structure.

According to this type of solar energy converter, the substance having diamond-crystal structure has a negative electron affinity and the property of easily emitting electrons. Therefore, such a substance is suitable for the electron emitter.

In the above-mentioned solar energy converter, the electron emitter may comprise carbon nanotube's.

According to this type of solar energy converter, since the carbon nanotube's diameter is extremely small among the substances having diamond-crystal structure made of carbon atoms, it has the property of easily emitting electrons concentrated on its tip, which has a small radius of curvature, due to the point concentration phenomenon of electric charges. Therefore, such a substance is suitable for the electron emitter.

In the above-mentioned solar energy converter, the electron emitter may comprise nitride boron nanotubes.

According to this type of solar energy converter, since the nitride boron nanotube is a substance of which diameter is extremely small, it has the property of easily emitting electrons concentrated on its tip with a small radius of curvature due to the point concentration phenomenon of electric charges. Therefore, such a substance is suitable for the electron emitter.

In the above-mentioned solar energy converter, a sunlight reflection member may be provided to let the sunlight, which is moving toward the electron accelerator and to the electron collector, reflect in a direction of the electron emitter.

According to this type of solar energy converter, since the sunlight reflection member makes sunlight, which is moving toward the electron accelerator and to the electron collector, reflect in the direction of the electron emitter, the reflected sunlight contributes to raising the temperature of the electron emitter. Therefore, sunlight can be utilized more efficiently.

In the above-mentioned solar energy converter, the electron accelerator may be so constructed as to have a function of reflecting the sunlight to make the sunlight, which is moving toward the electron accelerator and to the electron collector, reflect in a direction of the electron emitter.

According to this type of solar energy converter, since the electron accelerator has the function of reflecting sunlight to make the sunlight, which is moving toward the electron accelerator and to the electron collector, reflect in the direction of the electron emitter, the reflected sunlight contributes to raising the temperature of the electron emitter. Therefore, sunlight can be utilized more efficiently.

Specifically, cost reduction and easy assembling can be achieved due to disuse of a sunlight reflection member.

Further, since the sunlight reflection member is disposed not outside but within the sunlight-concentrating instrument, there is no chance of it getting dirty. Therefore, a degradation of reflection efficiency is not occurred.

In the above-mentioned solar energy converter, the electron collector may be provided on a lower surface of the light-concentrating instrument and below the electron accelerator, and the lower surface of the light-concentrating instrument may be formed into a curved surface which inclines toward the electron collector.

According to this type of solar energy converter, electrons that have directly collided not with the electron collector but with the light-concentrating instrument can easily reach the electron collector by moving along the upwardly inclined lower surface of the light-concentrating instrument leading to the electron collector. Therefore, electrons can be collected more efficiently.

According to the fifth aspect of the present invention, the above-mentioned solar energy converter is used as one unit in the solar energy conversion system, and the solar energy conversion system comprises a set of solar energy converters in which a plurality of solar energy converters are connected in parallel or in series.

According to the solar energy conversion system, the above-mentioned solar energy converter is used as one unit and the solar energy conversion system comprises a set of solar energy converters in which a plurality of solar energy converters are connected in parallel or in series. Therefore, it is possible to construct a desired solar energy conversion system by connecting the units in accordance with the setting conditions.

PREFERRED EMBODIMENT OF THE INVENTION

Embodiments of the present invention are illustrated in detail with the drawings below.

First Embodiment

Figure 1:
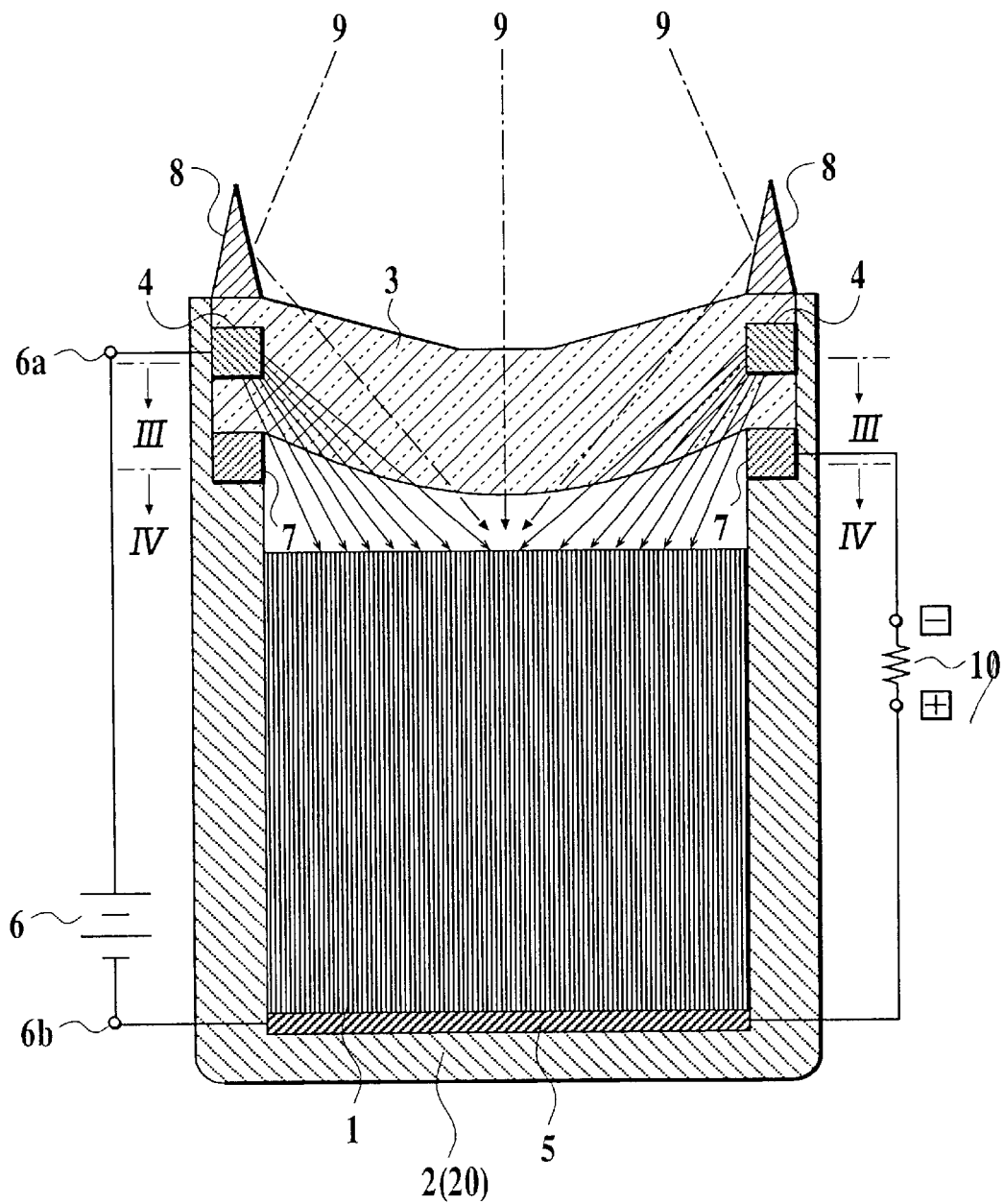
FIG. 1 is a cross-sectional side view showing a solar energy converter according to the first embodiment of the invention.
Figure 2:
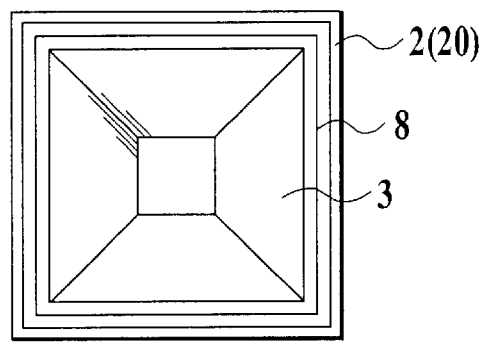
FIG. 2 is a plane view showing a solar energy converter according to the first embodiment of the invention.

FIG. 1 is a cross-sectional side view showing a solar energy converter according to the first embodiment of the present invention. FIG. 2 is a plane view showing the solar energy converter according to the first embodiment of the present invention.

As shown in FIGS. 1 and 2, the solar energy converter 100 comprises an insulated vacuum vessel 2 containing an electron emitter 1 therein. A light-concentrating instrument 3 made of insulated material that is pervious to light, is attached to the upper portion of the vacuum vessel 2. An electron accelerator 4 is provided within a light-concentrating instrument 3. A cathode 5 is provided at the bottom of a vacuum vessel 2, and is electrically connected with the electron emitter 1. The electron accelerator 4 and the cathode 5 are connected with an electric field supplier 6.

Figure 3:
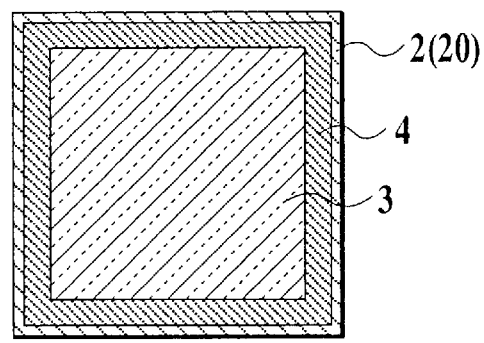
FIG. 3 is a cross-sectional plane view cut along the line III—III shown in FIG. 1.
Figure 4:
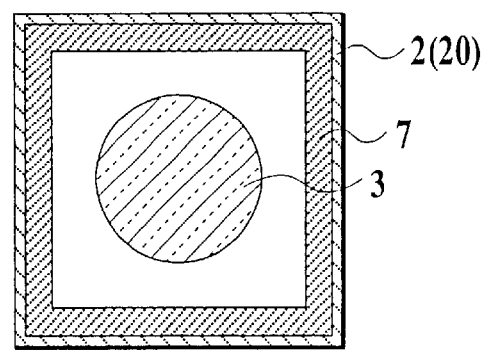
FIG. 4 is a cross-sectional plane view cut along the line IV—IV shown in FIG. 1.

An electron collector 7 is provided in the vacuum vessel 2 positioned below the electric accelerator 4, while coming into contact with the lower surface of the light-concentrating instrument 3. Further, a sunlight reflection member 8 is provided on the upper surface of the light-concentrating instrument 3 and above the electron accelerator 4. FIG. 3 is a cross-sectional view, cut along the line III—III shown in FIG. 1. FIG. 4 is a cross-sectional view, cut along the line IV—IV shown in FIG. 1. As shown in FIGS. 3 and 4, the electron accelerator 4 and electron collector 7 are rectangular-shaped electrodes, and come in contact with the inside of the vacuum vessel 2.

The electron emitter 1 emits electrons in an electric field. To put it concretely, the electron emitter comprises a substance having the property of emitting electrons by virtue of the following phenomena.

In general, when a strong electric field is applied to the surface of a solid body, a potential barrier on the surface holding electrons within the solid body becomes lower and thinner, so that the electrons are emitted in a vacuum by tunneling effect. This is called an electric field emission phenomenon. In particular, when a substance having a small radius of curvature is placed in the electric field, electric charges are concentrated on its tip with a small radius of curvature, and which facilitates electron emission. This is called a point concentration phenomenon. This phenomenon is well known in a field of electric discharge engineering. Specifically, a substance having diamond-crystal structure has a negative electron affinity and the property of easily emitting the electrons in the conduction band.

Such a substance having diamond-crystal structure mainly comprises carbon atoms like a carbon nanotube. The carbon nanotube has an extremely small diameter, so that electrons within the carbon nanotube are concentrated on its tip due to the point concentration phenomenon, and are attracted to positive charges due to Coulomb force. When the electric field applied to the carbon nanotube is greater than an electron emission threshold value, a part of the electrons concentrated on its tip with a small radius of curvature is emitted into space. In addition, the carbon nanotube is an extremely small tubular substance having several nano-meters in diameter, so that it can easily emit electrons even in a weak electric field.

The vacuum vessel 2 is formed from an insulated material and provided in such a manner that the light-concentrating instrument 3 can be attached to the upper portion thereof. The inside of the vacuum vessel 2 is kept as a vacuum.

The light-concentrating instrument 3 is an insulated material that is pervious to light, comprising glass made of $SiO_2$ or synthetic resins, and formed into a convex lens-shape so as to have the function of concentrating light and irradiating the concentrated sunlight 9 on the electron emitter 1.

The electron accelerator 4 is connected with a positive terminal 6a of the electric field supplier 6 and the cathode 5 is connected with a negative terminal of the electric field supplier 6, and thereby electric lines of force (an electric field) from the electric accelerator 4 to the cathode 5 can be generated. The electron accelerator 4 and cathode 5 comprise a conductive material, for example, stainless steel or aluminum is suitable for them.

A conductive material comprising a tetravalent element, such as silicon or a carbonaceous material may be used as the cathode 5. In particular, if the material comprising a tetravalent element such as a carbon graphite or a silicon carbide contains a predetermined amount of either a trivalent element such as boron, aluminum, gallium, indium, thallium or the like, or a pentavalent element such as nitrogen, phosphorus, arsenic, antimony, bismuth or the like, by using a diffusion method of semiconductor fabrication or an ion-implantation method, the trivalent element or pentavalent element becomes a carrier contributing to electric conductivity. Hence, the conductivity of the cathode 5 is increased and the efficiency of energy conversion can be improved.

The electric field supplier 6 is a direct current power supply.

The electron collector 7 is an electrode for collecting electrons flying toward the electron accelerator 4 in the vacuum vessel 2. The electron collector 7 comprises a conductive material, for example, copper or aluminum is suitable for it. The sunlight reflection member 8 is, for example, a reflection material which from a cross-sectional view appears triangular and is coated with aluminum. The sunlight reflection member 8 is disposed on the upper surface of the light-concentrating instrument 3 and above the electron accelerator 4. The sunlight reflection member 8 makes the sunlight 9, which is moving toward the electron accelerator 4 and to the electron collector 7, reflect in the direction of the electron emitter 1 to collect the sunlight 9 efficiently.

Next, the behaviors of the solar energy converter 100 for generating electric energy are illustrated. In this embodiment of the present invention, the solar energy converter 100 in which carbon nanotubes are used as the electron emitter 1 for emitting electrons in an electric field is explained below.

The sunlight 9 concentrated by the light-concentrating instrument 3 is irradiated on carbon nanotubes used as the electron emitter 1. The temperature of the carbon nanotubes is raised by irradiation of the sunlight 9, and kinetic energy of electrons in the region irradiated by the sunlight 9 is increased. Since the inside of the vacuum vessel 2 is kept as a vacuum, the amount of generated energy that is conducted to the outer area is negligible. As a result, there is almost no energy loss in this part. When the electric field supplier 6 of which positive terminal 6a is connected to the electron accelerator 4 and negative terminal 6b is connected to the cathode 5 applies voltage to the electron accelerator 4 and the cathode 5, an electric field similar to the electric lines of force shown by solid arrows in FIG. 1 is generated. The generated electric field acts on the carbon nanotubes used as the electron emitter 1.

The carbon nanotube is an extremely small tubular substance having several nano-meters diameter, and electrons concentrated on its tip with a small radius of curvature are emitted due to the point concentration phenomenon even in a considerably weak electric field. In particular, the kinetic energy of the electrons increases as thermal energy is increased by irradiation of the sunlight 9. The electrons that have gained sufficient kinetic energy are emitted into a vacuum vessel.

Figure 5:
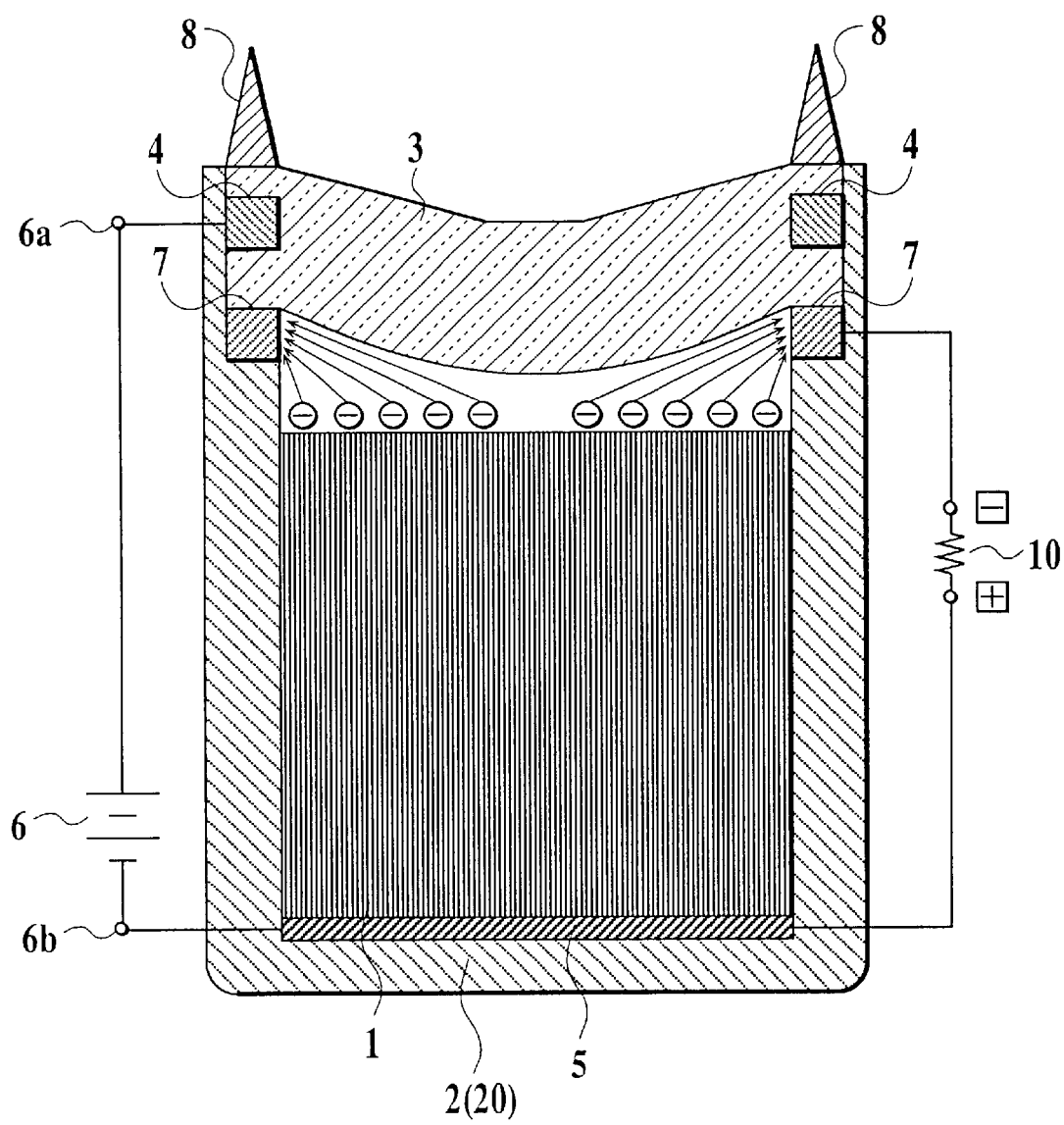
FIG. 5 is a cross-sectional side view showing a solar energy converter according to the first embodiment of the invention.

As shown in FIG. 5, the emitted electrons are accelerated by the electric field, and fly toward the electron accelerator 4. However, the electron accelerator 4 is disposed within the light-concentrating instrument 3 made of an insulated material, so that the emitted electrons cannot reach the electron accelerator 4, and eventually collide with the electron collector 7 near the electron accelerator 4 or the lower surface of the light-concentrating instrument 3. All the emitted electrons that have collided with the lower surface of the light-concentrating instrument 3 approach the electron collector 7 along the inclined lower surface of the light-concentrating instrument 3. When the emitted electrons approach the electron collector 7, positive charges are induced on the surface of the electron collector 7 due to a charge-induction phenomenon, and the electrons are attracted to the induced positive charges due to Coulomb force. All the emitted electrons ultimately collide with the electron collector 7 and are absorbed in it. Since the light-concentrating instrument 3 and the vacuum vessel 2, which are located around the electron collector 7, are insulated, the emitted electrons can be efficiently absorbed into the electron collector 7.

As a result of the above-mentioned phenomenon, the electron collector 7 has an excess of electrons, therefore it is charged negatively and comes into the same state as the negative pole of a battery. On the other hand, the electron emitter 1 lacks electrons since it has emitted the electrons, so that the cathode 5, which is electrically connected with the electron emitter 1, is charged positively and comes into the same state as the positive pole of a battery. In this state, when a resister 10 of an electric load is electrically connected with the cathode 5 used as a positive electrode and with the electron collector 7 used as a negative electrode, the excessive electrons in the electron collector 7 migrate through the resistance 10 to the cathode 5 lacking electrons, and return to the electron emitter 1. This electron circulation makes it possible to generate electric energy.

In order for the electrons to be emitted from the electron emitter 1, they need to gain sufficient energy to overcome a potential-energy barrier formed in a conductive material. In other words, it is necessary for the electron emitter to give the electrons to be emitted sufficient energy to fly out from the material. Namely, when the electrons are emitted from the electron emitter 1, the electron emitter 1 loses the same amount of energy as the electrons have been given. Because the electron emitter 1 loses a small amount of energy, the temperature thereof is decreased. For this reason, in order for the electrons to continue to be emitted, the electron emitter 1 needs to replenish the energy loss. Accordingly, the solar energy converter 100 is constructed in such a manner that the electron emitter 1 can replenish the energy loss with energy from sunlight 9 so as to continue to emit electrons. Namely, the solar energy converter 100 can continue to convert solar energy into electric energy.

A carbon nanotube is an extremely small tubular substance, ranging from several micrometers to several tens of micrometers in length, and several nanometers in diameter. In the solar energy converter 100 of the present invention, since the electron emitter 1 can be adjusted to arbitrary volume and shape in accordance with a quantity of carbon nanotubes, it can be formed into arbitrary volume and shape in accordance with an amount of electric power generated. In particular, it is preferable to form the electron emitter 1 with such surface area and thickness that solar energy can be properly supplied to the carbon nanotubes. Further, since the carbon nanotube is an extremely small substance, it is possible to form an extremely small and thin solar energy converter 100 by using an extremely small and thin electron emitter 1.

Next, the amount of electric power consumed by the electron accelerator 4 is considered below. In order to accelerate electrons, it is necessary to apply positive voltage to the electron accelerator 4. For this reason, an electric field supplier 6 is needed. The electron accelerator 4 is used only for the purpose of accelerating electrons, so that the electrons do not collide with the electron accelerator 4. Namely, the electric field supplier 6 of an electric power supply for accelerating electrons is used only for applying electro-static Coulomb force to the electrons. Therefore, almost no current flows from the electric field supplier 6 and the amount of electric power consumption of the electric field supplier 6 is almost equal to zero. In this manner, the amount of electric power consumed by the electric field supplier 6 is almost zero, so that the electric power consumption required for electric generation becomes almost zero. Hence, it is concluded that the solar energy converter 100 has extremely high practicality as well as high efficiency in converting solar energy into electric energy.

As mentioned above, in the solar energy converter 100, the current supplied from the electric field supplier 6 to generate an electric field is almost equal to zero, and the sunlight 9 capable of supplying stable energy for a long time is used as a thermal energy source to generate and supply electric power. Moreover, since the solar energy converter 100 can convert solar energy, using a wide range of the spectra of the sunlight 9, into electric energy, the efficiency of energy conversion is preferable.

In addition, the solar energy converter 100 of the present invention does not require special materials with limited availability or a high production cost, and its structure is also simple. Therefore, it is concluded that the solar energy converter 100 has great possibility of coming to wide use because of a low production cost.

Since the materials used in the solar energy converter 100 are produced by using glass, synthetic resin and metals such as stainless steel and the like, they hardly degrade. Namely, the solar energy converter 100 has durability and a long operation-life. Moreover, the materials do not cause the destruction of the environment, so that the solar energy converter 100 does not affect the environment even if it is used on a large scale.

Further, since the solar energy converter 100 having durability and along-operation life houses each electrode, the property of the electrode hardly degrades. Therefore, it is possible to use over a long period of time at a low maintenance cost. Still further, the solar energy converter 100 of the present invention can be lightweight and compact for use in many places.

By the above-mentioned features, it is concluded that the solar energy converter of the present invention has extremely high practicality.

In the solar energy converter 100 according to the first embodiment of the invention, a vacuum vessel 2 is used as a vessel for housing the electron emitter 1, and the inside thereof is kept as a vacuum. The inside, however, is not limited to a vacuum state. The inside of the vessel may be filled with inert gas such as argon, neon or the like. In this case, a sealed vessel 20 replaces the vacuum vessel 2. In this manner, if the sealed vessel 20 is filled with inert gas, the efficiency of electron emission is improved. However, compared with the vacuum vessel 2, the efficiency of energy conversion of the sealed vessel 20 filled with inert gas may be lowered. This is because thermal energy disperses to the outside through the inert gas. Accordingly, a solar energy converter having this structure is suitable for such an originally hot place that thermal energy cannot disperse to the outside.

In the solar energy converter 100 according to the first embodiment of the invention, the electron emitter 1 comprises carbon nanotubes. The electron emitter 1, however, is not limited to carbon nanotubes. The electron emitter 1 may comprise nitride boron nanotubes. A nitride boron nanotube is an extremely small tubular substance that has several nanometers in diameter, like a carbon nanotube. The nitride boron nanotube has the property of easily emitting electrons concentrated on its tip with a small radius of curvature due to the point concentration phenomenon of electric charges even in a weak electric field. Therefore, the nitride boron nanotube can effectively function as the electron emitter 1.

Second Embodiment

Figure 6:
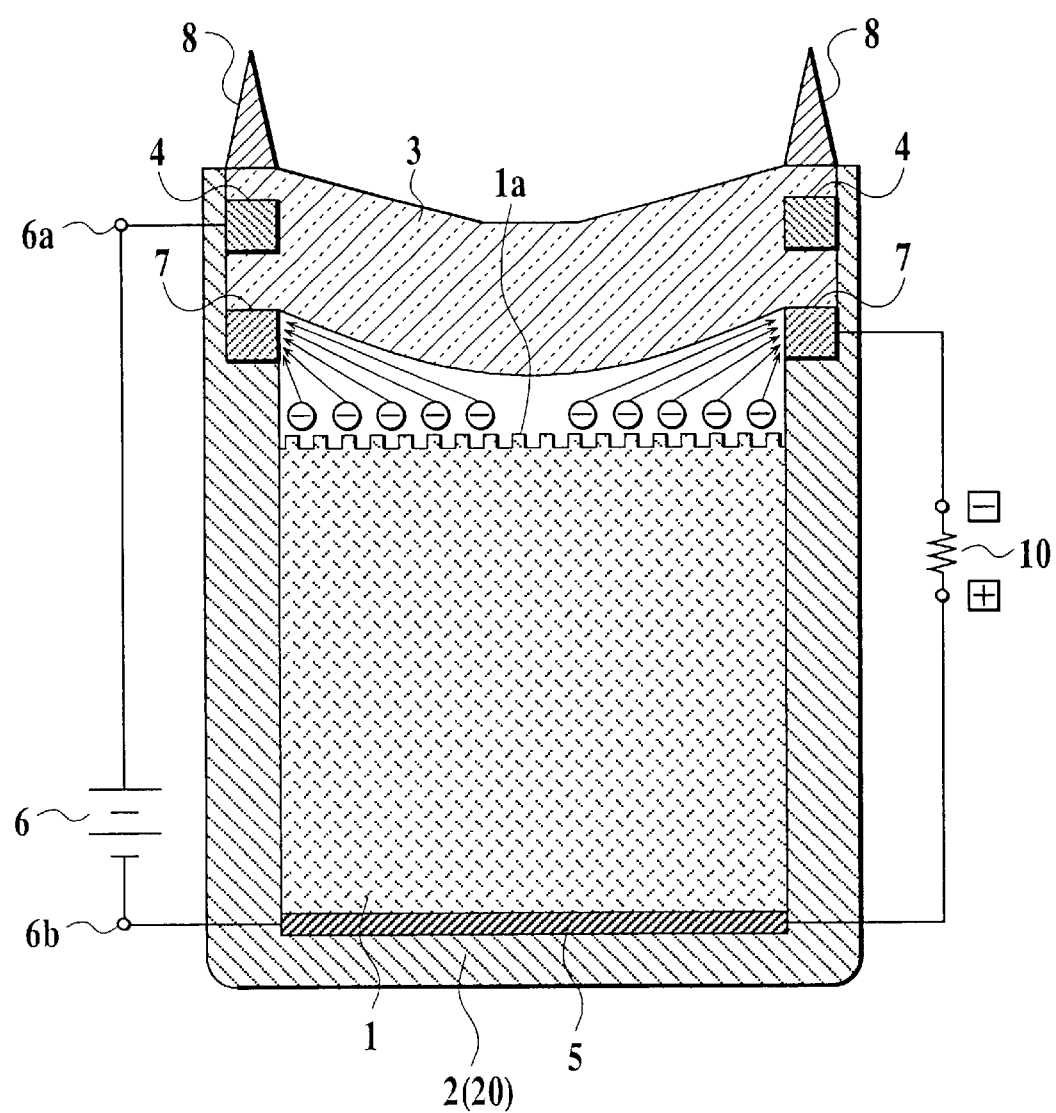
FIG. 6 is a cross-sectional side view showing a solar energy converter according to the second embodiment of the invention.

FIG. 6 shows a solar energy converter according to the second embodiment of the invention. In the figure, the same reference numerals are attached to the same parts of the second embodiment of the invention as the first embodiment, and only different parts are explained below.

In the solar energy converter 200 according to the embodiment of the invention, the electron emitter 1 comprises diamond. The diamond used in the solar energy converter is constructed in such a manner that ions are implanted into a flat plate-shaped diamond so as to form nanoscale projections and cavities on its surface. This is for the purpose of improving the electron emission characteristics. By using such an electron emitter 1, the same working effect as the first embodiment can be obtained.

Third Embodiment

Figure 7:
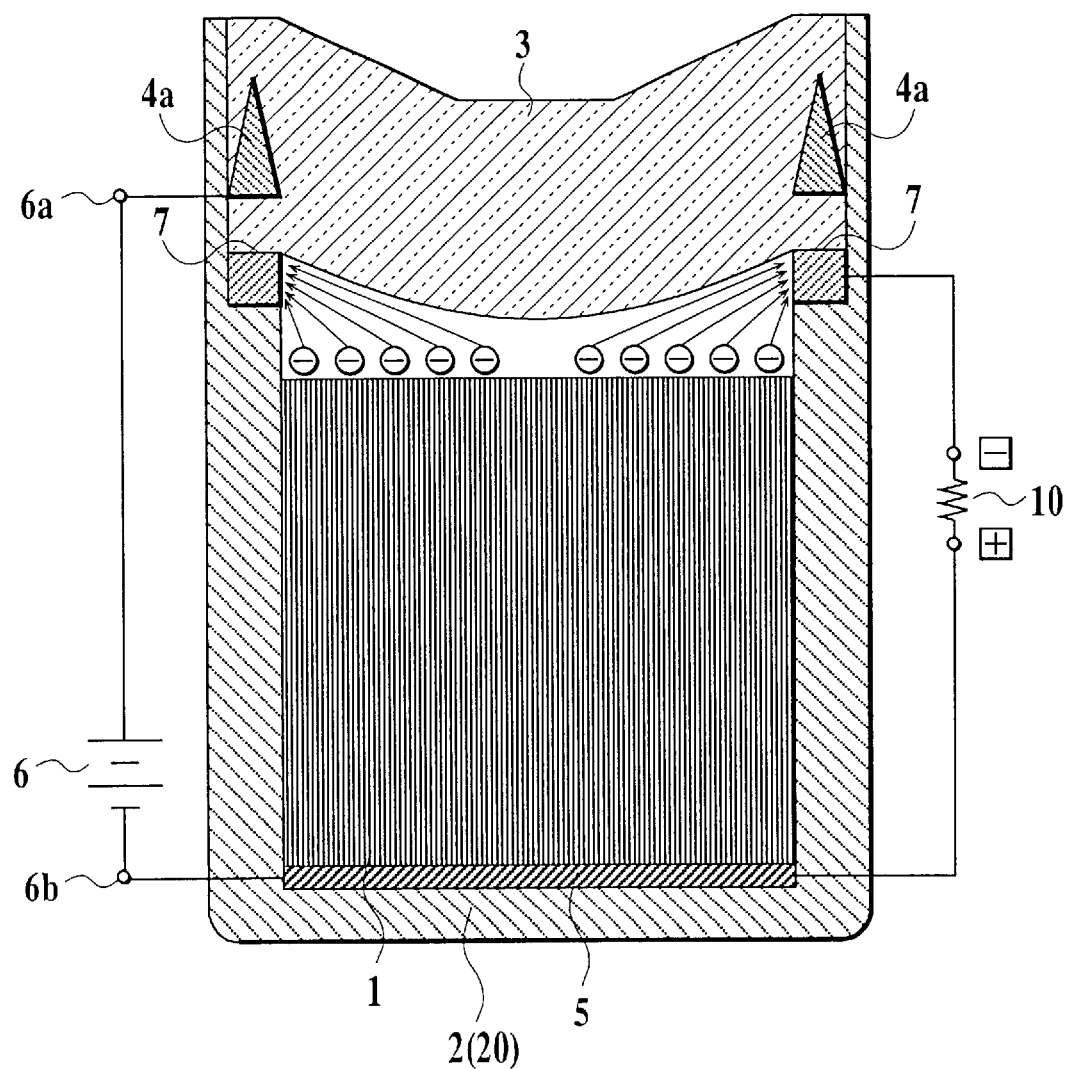
FIG. 7 is a cross-sectional side view showing a solar energy converter according to the third embodiment of the invention.

FIG. 7 shows a solar energy converter according to the third embodiment of the invention. In the figure, the same reference numerals are attached to the same parts of the third embodiment of the invention as the first embodiment, and only different parts are explained below.

In the solar energy converter 300 according to this embodiment of the invention, the electron accelerator 4a is coated with, for example, aluminum or the like to perform the role of a sunlight reflection member. The electron accelerator 4a is so constructed as to let the sunlight which irradiates on it, and the sunlight 9 directed to the electron collector 7, reflect in the direction of the electron emitter 1. This is for the purpose of increasing the sunlight 9 concentration efficiency.

When the sunlight reflection member 8 is provided on the upper surface of the light-concentrating instrument 3, that is, provided outside of the light-concentrating instrument 3, the function of the sunlight reflection member 8 may be degraded by dust and dirt attached to the surface. However, since the electron accelerator 4a, functioning as the sunlight reflection member, is disposed within the light-concentrating instrument 3, function degradation cannot occur. Therefore, the sunlight 9 can be considerably efficiently reflected in the direction of the electron emitter 1.

Further, the same effect as the first embodiment of the invention can be obtained by using such an electron accelerator 4a. Still further, a component member used as a reflection member 8 is not needed, so that a low production cost and easy assembling can be achieved.

Fourth Embodiment

Figure 8:
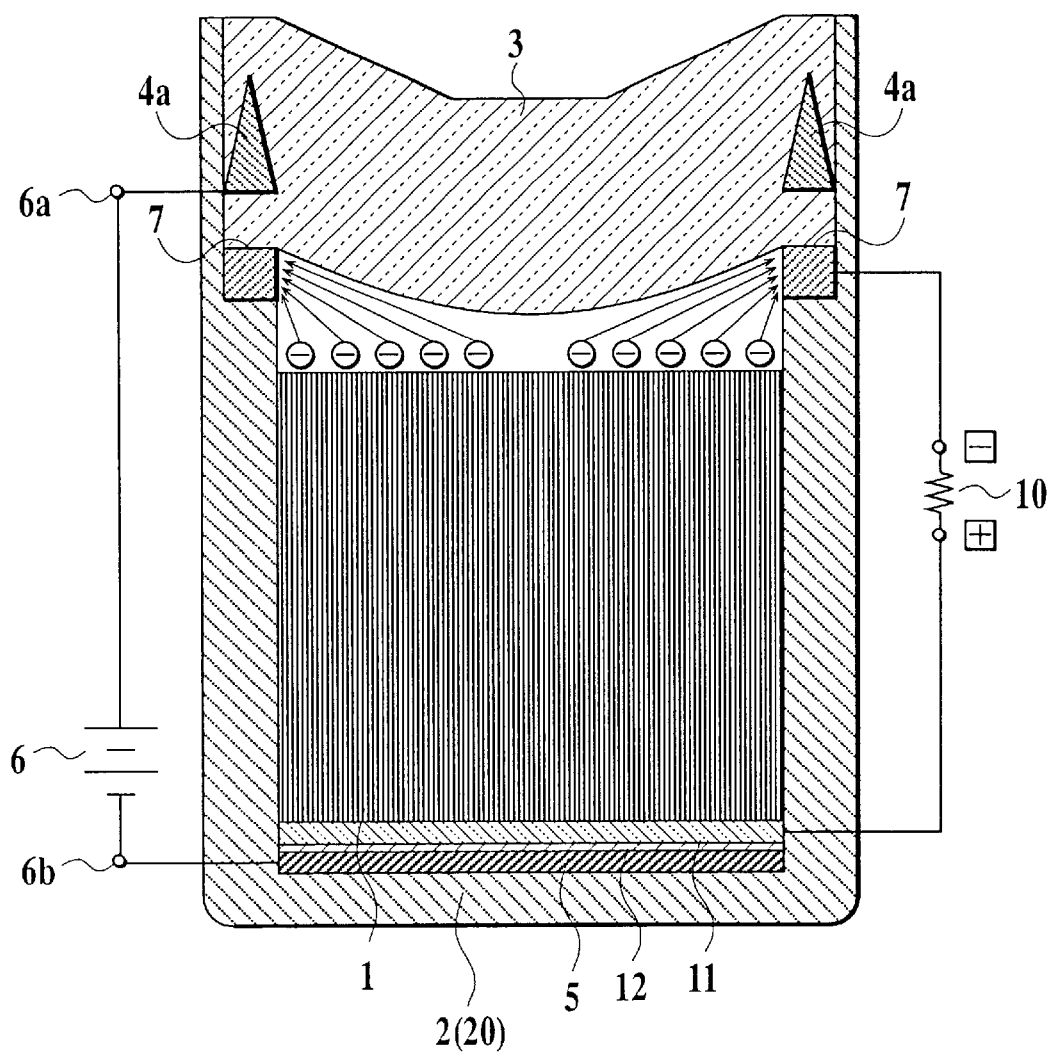
FIG. 8 is a cross-sectional side view showing a solar energy converter according to a fourth embodiment of the invention.

FIG. 8 shows a solar energy converter according to the fourth embodiment of the invention. In the figure, the same reference numerals are attached to the same parts of the fourth embodiment of the invention as the first embodiment, and only different parts are explained below.

In the solar energy converter 400 according to the embodiment of the invention, a substrate 11 is electrically connected with the electron emitter 1, and an insulator 12 is sandwiched between the substrate 11 and a cathode 5.

The substrate 11 comprises a conductive material, for example, stainless steel or aluminum is suitable for the substrate 11.

Further, the substrate 11 may comprise a conductive material of a tetravalent element, such as silicon or a carbonaceous material. Specifically, if a carbon graphite or a silicon carbide comprising a tetravalent element contains a predetermined amount of trivalent element such as boron, aluminum, gallium, indium, thallium or the like, or a predetermined amount of pentavalent element such as nitrogen, phosphorus, arsenic, antimony, bismuth or the like, by using a diffusion method of semiconductor fabrication or an ion-implantation method, the trivalent element or pentavalent element becomes a carrier contributing to electric conductivity. Hence, the conductivity of the cathode 5 is increased and the efficiency of energy conversion can be improved.

Any materials having conductivity can be used as the insulator 12. The insulator 12 is so disposed as to insulate the substrate 11 from the cathode 5.

Next, the behaviors of the solar energy converter 400 is explained.

The positive terminal 6a of the electric field supplier 6 is connected with the electron accelerator 4 and the negative terminal 6b of the electric field supplier 6 is connected with the cathode 5, so that electric lines of force (electric field) from the electric accelerator 4 to the cathode 5 is generated. The electron accelerator 4 and cathode 5 comprise conductive materials, for example, stainless steel or aluminum is suitable for them.

The electron emitter 1 emits electrons on the basis of the electric lines of force (electric field) and solar energy from the sunlight 9 concentrated by the light-concentrating instrument 3, and the electron collector 7 collects the emitted electrons.

As a result, the electron collector 7 has an excess of electrons by absorbing the emitted electrons. Hence, the electron collector 7 is charged negatively and becomes the same as the negative pole of a battery. On the other hand, the electron emitter 1 lacks electrons since it has emitted the electrons. Hence the substrate 11 electrically connected with the electron emitter 1 is charged positively and becomes the same as the positive pole of a battery. In this state, when a resister 10 of an electric load is electrically connected with the substrate 11 used as a positive electrode and with the electron collector 7 used as a negative electrode, the excessive electrons in the electron collector 7 migrate through the resistance 10 to the substrate 11 lacking electrons, and return to the electron emitter 1. This electron circulation phenomenon makes it possible to generate and utilize electric energy.

In particular, since the substrate 11 is insulated from the cathode 5 by the insulator 12, no electron migrates between them. Namely, electron migration on the side of the electric field supplier 6 is separated from that in the behavior of the solar energy converter 400.

Fifth Embodiment

FIGS. 9 to 12 show a solar energy conversion system in which a plurality of the solar energy converters of the invention are connected to make a set of solar energy converters. In the figures, the same reference numerals are attached to the same parts of a set of solar energy converters as the first embodiment, and only different parts are explained below. The solar energy conversion system 500 is explained on the basis of the structure of the solar energy converter 300.

The above-mentioned solar energy converter 300 can generate electricity even though it is a single body. However, in order for electricity to be generated on a large scale, it is necessary to construct a solar energy conversion system 500 in which a plurality of solar energy converters 300 are connected to make a set of solar energy converters.

Figure 9:
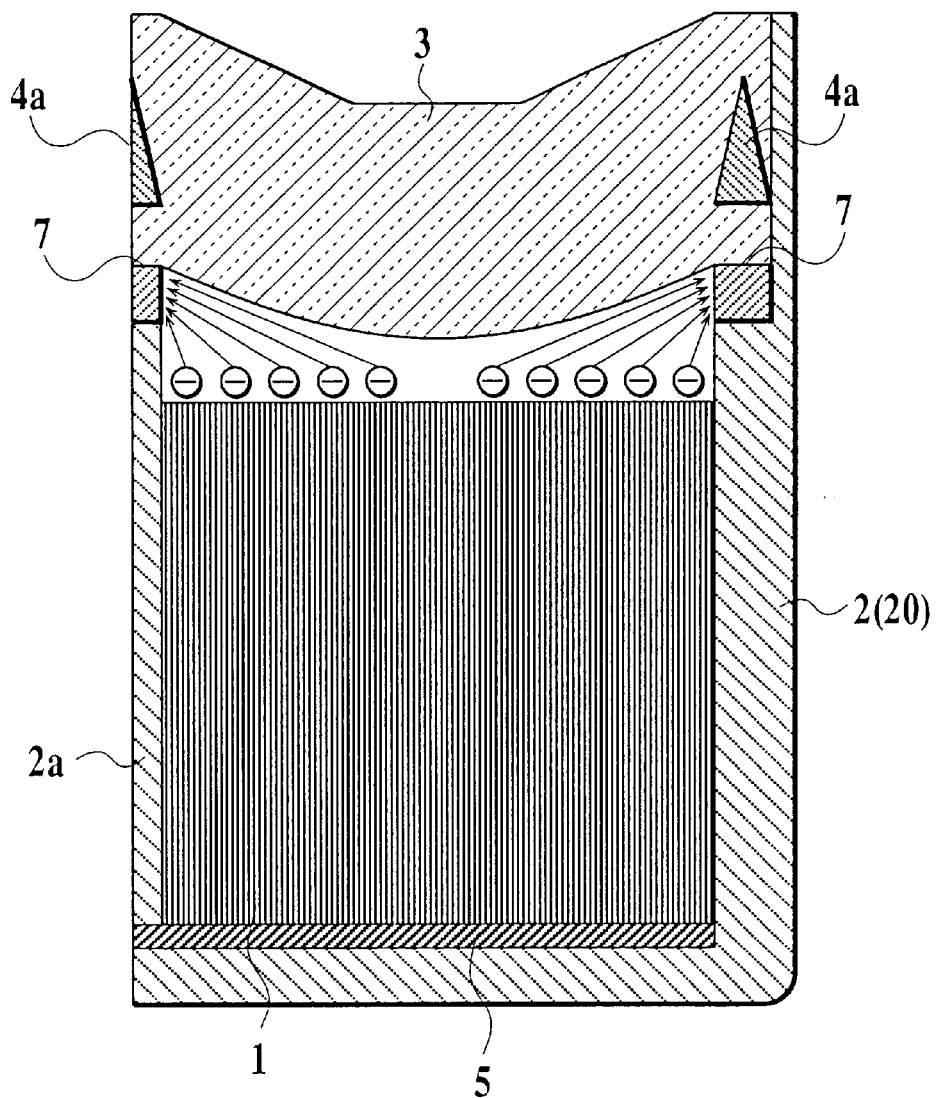
FIG. 9 is a cross-sectional side view showing one unit for composing a solar energy conversion system according to the fifth embodiment of the invention.
Figure 10:
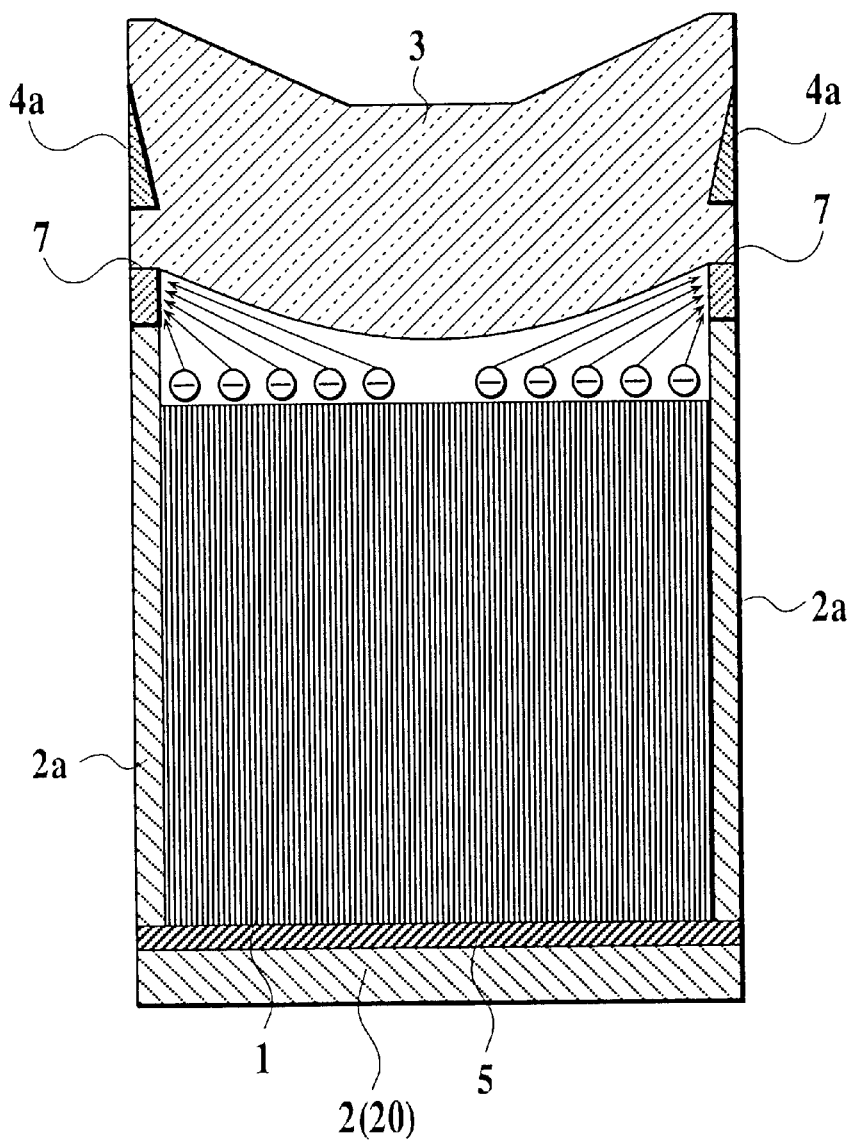
FIG. 10 is a cross-sectional side view showing one unit constructing a solar energy conversion system according to the fifth embodiment of the invention.

FIGS. 9 and 10 respectively show a unit 300a and a unit 300b of the solar energy converter which are components of the solar energy conversion system 500, which in turn is based on the solar energy converter 300 shown in FIG. 7.

In the units of 300a and 300b, a supporting wall 2a for partitioning the electron emitters 1 comprises $SiO_2$ or SiC. Specifically, if the supporting wall is made of SiC, it is possible to select which section is to be the supporting walls 2a and which is to be carbon nanotubes. This is because both the supporting walls 2a and the carbon nanotubes can be made from SiC. For example, a masking method for integrated circuit fabrication is used to make sure the supporting walls 2a remain and silicon of the SiC is combined with oxygen to form carbon nanotubes.

Figure 11:
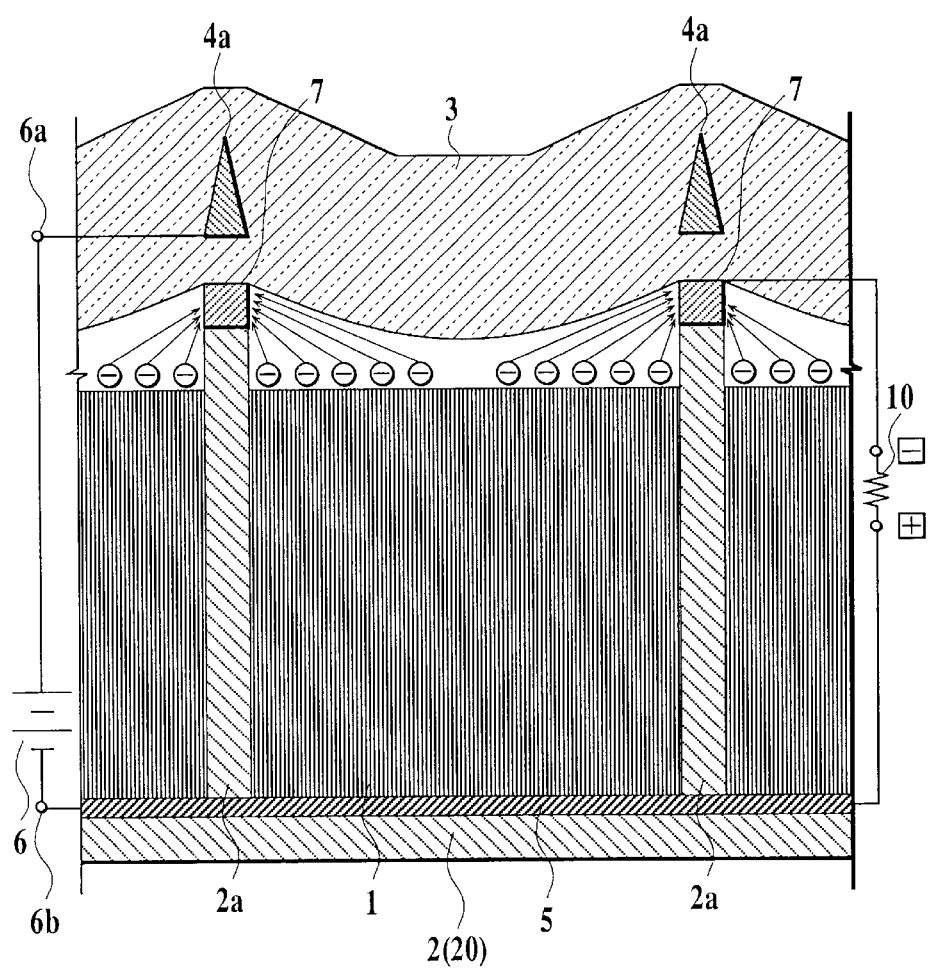
FIG. 11 is a cross-sectional side view showing a solar energy conversion system according to the fifth embodiment of the invention.
Figure 12:
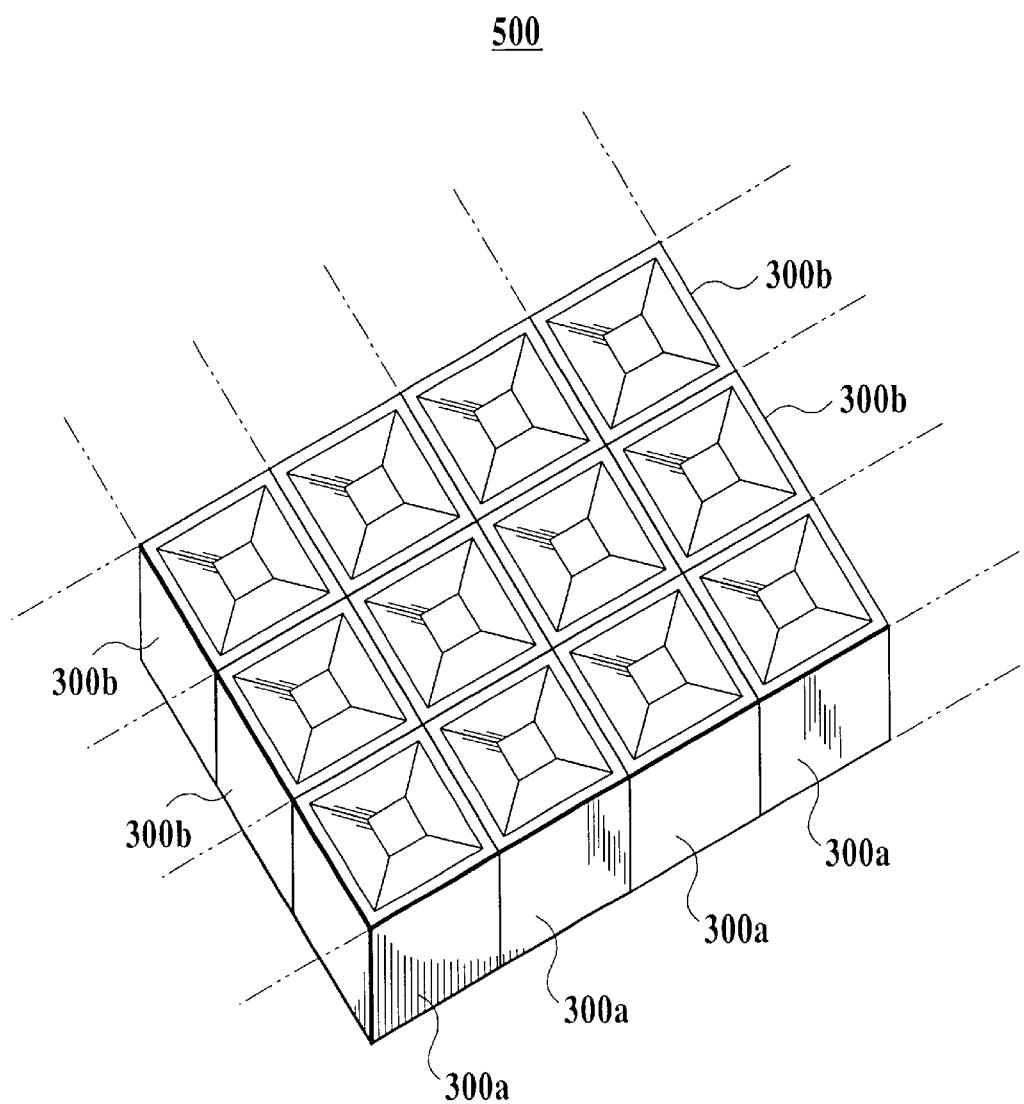
FIG. 12 is a perspective view showing a solar energy conversion system according to the fifth embodiment of the invention.

The solar energy conversion system 500 shown in FIGS. 11 and 12 may be constructed by connecting the units of 300a and 300b in series or in parallel. If the solar energy conversion system 500 is constructed by connecting those units 300a and 300b, the electron accelerators 4a are disposed in a mesh-shape or in a grid-shape inside of the light-concentrating instrument 3, and which function as a reinforcement member to increase the strength of the light-concentrating instrument 3. Similarly, the electron collectors 7 are disposed in a mesh-shape or in a grid-shape in the upper part of the supporting wall 2a and the vacuum vessel 2 inside of the solar energy conversion system 500, and which function as a reinforcement member to increase the strength of the solar energy conversion system 500.

In this matter, since the solar energy conversion system 500 is constructed by connecting a plurality of units of 300a and 300b, it is possible to connect and assemble the units of 300a and 300b in accordance with the place where they are installed. Hence, the solar energy conversion system 500 can make it possible to generate the desired amount of electricity.

In the fifth embodiment of the invention, the solar energy conversion system 500 is constructed by connecting the units of 300a and 300b on the basis of the solar energy converter 300. However, the solar energy conversion system 500 is not limited to the fifth embodiment of the invention, and may be constructed by connecting the units on the basis of the solar energy converters 100, 200 and 400.

Further, in the fifth embodiment of the invention, the solar energy conversion system 500 is constructed by connecting a plurality of independent units of 300a and 300b. However, the solar energy conversion system 500 is not limited to this embodiment of the invention, and may be constructed by the units of 300a and 300b united in a body.

In the above-mentioned embodiments from the first to the fifth, the light-concentrating instrument 3 is formed in a convex lens-shape. However, the present invention is not limited to this. The light-concentrating instrument 3 can be a window that is pervious to light. For example, it is possible to irradiate sunlight on the electron emitter 1 through light-concentrating members such as a convex lens or a concave mirror from the outside of the window.

Further, the resistance 10 connected with the cathode 5 and the electron collector 7 is a typical example to explain electric energy generation and utilization using the electron circulation phenomenon. Equipment for using electric energy generated by passing electrons through the resistance 10 is not specified. Moreover, insulating materials used as structure materials are not specified. It is a matter of course that the particular structure can be properly changed.

The entire disclosure of Japanese Patent Application No. Tokugan 2001-381915 filed on Dec. 14, 2001 including specification, claims drawings and summary are incorporated herein by reference in its entirety.

What is claimed is:

1. A solar energy converter comprising:
a light-concentrating instrument for concentrating sunlight;
an electron emitter in an insulated vacuum vessel, emitting electrons in a vacuum as a temperature rises from irradiation of the sunlight concentrated by said light-concentrating instrument;
an electron accelerator within said light-concentrating instrument;
a cathode on a surface of said electron emitter opposite to a light-irradiated surface which is irradiated by the sunlight, and electrically connected with said electron emitter;
an electric field supplier having a positive terminal and a negative terminal; and
an electron collector in said vacuum vessel, collecting the emitted electrons flying from said electron emitter toward said electron accelerator,
wherein said electron accelerator is connected with the positive terminal of said electric field supplier and said cathode is connected with the negative terminal of said electric field supplier so that an electric field is generated, and said electron collector is used as a negative generator electrode and said cathode is used as a positive generator electrode in which the collected electrons in said electron collector migrate to said electron emitter to generate electricity.

2. A solar energy converter comprising:
a light-concentrating instrument for concentrating sunlight;
an electron emitter in an insulated and sealed vessel filled with inert gas, emitting electrons into space as a temperature rises from irradiation of the sunlight concentrated by said light-concentrating instrument;
an electron accelerator within said light-concentrating instrument;
a cathode on a surface of said electron emitter opposite to a light-irradiated surface which is irradiated by the sunlight, and electrically connected with said electron emitter;
an electric field supplier having a positive terminal and a negative terminal; and
an electron collector in said insulated and sealed vessel filled with the inert gas, collecting the emitted electrons flying from said electron emitter toward said electron accelerator,
wherein said electron accelerator is connected with the positive terminal of said electric field supplier and said cathode is connected with the negative terminal of said electric field supplier so that an electric field is generated, and said electron collector is used as a negative generator electrode and said cathode is used as a positive generator electrode in which the collected electrons in said electron collector migrate to said electron emitter to generate electricity.

3. A solar energy converter comprising:
a light-concentrating instrument for concentrating sunlight;
an electron emitter in an insulated vacuum vessel, emitting electrons in a vacuum as a temperature rises from irradiation of the sunlight concentrated by said light-concentrating instrument;
an electron accelerator within said light-concentrating instrument;
a substrate on a surface of said electron emitter opposite to a light-irradiated surface which is irradiated by the sunlight, and electrically connected with said electron emitter;
an electric field supplier having a positive terminal and a negative terminal;
an electron collector in said vacuum vessel, collecting the emitted electrons flying from said electron emitter toward said electron accelerator; and
a cathode on a surface of said substrate opposite to a touching surface which touches said electron emitter,
wherein said electron accelerator is connected with the positive terminal of said electric field supplier and said cathode is connected with the negative terminal of said electric field supplier so that an electric field is generated, and said electron collector is used as a negative generator electrode and said substrate is used as a positive generator electrode in which the collected electrons in said electron collector migrate to said electron emitter to generate electricity.

4. A solar energy converter comprising:
a light-concentrating instrument for concentrating sunlight;
an electron emitter in an insulated and sealed vessel filled with inert gas, emitting electrons into space as a temperature rises from irradiation of the sunlight concentrated by said light-concentrating instrument;
an electron accelerator within said light-concentrating instrument;
a substrate on a surface of said electron emitter opposite to a light-irradiated surface which is irradiated by sunlight, and electrically connected with said electron emitter;
an electric field supplier having a positive terminal and a negative terminal;
an electron collector in said insulated and sealed vessel filled with the inert gas, collecting the emitted electrons flying from said electron emitter toward said electron accelerator; and
a cathode provided on a surface of said substrate opposite to a touching surface which touches said electron emitter,
wherein said electron accelerator is connected with the positive terminal of said electric field supplier and said cathode is connected with the negative terminal of said electric field supplier so that an electric field is generated, and said electron collector is used as a negative generator electrode and said cathode is used as a positive generator electrode in which the collected electrons in said electron collector migrate to said electron emitter to generate electricity.

5. A solar energy converter as claimed in claim 3 or 4, wherein an insulator is sandwiched between said cathode and said substrate.

6. A solar energy converter as claimed in claim 3 or 4, wherein said substrate comprises a tetravalent element.

7. A solar energy converter as claimed in claim 3 or 4, wherein said substrate comprises a tetravalent element containing an amount of either a trivalent element or a pentavalent element.

8. A solar energy converter as claimed in claim 1 or 2, wherein said cathode comprises a tetravalent element.

9. A solar energy converter as claimed in claim 1 or 2, wherein said cathode comprises a tetravalent element containing an amount of either a trivalent element or a pentavalent element.

10. A solar energy converter as claimed in one of claims 1 to 4, wherein said electron emitter comprises carbon.

11. A solar energy converter as claimed in one of claims 1 to 4, wherein said electron emitter comprises a material having diamond-crystal structure.

12. A solar energy converter as claimed in one of claims 1 to 4, wherein said electron emitter comprises carbon nanotubes.

13. A solar energy converter as claimed in one of claims 1 to 4, wherein said electron emitter comprises nitride boron nanotubes.

14. A solar energy converter as claimed in one of claims 1 to 4, wherein a sunlight reflection member is provided for letting the sunlight, which is moving toward said electron accelerator and to said electron collector, reflect in a direction of said electron emitter.

15. A solar energy converter as claimed in one of claims 1 to 4, wherein said electron accelerator has a function of reflecting the sunlight, and is so constructed as to let the sunlight which irradiates on it and the sunlight directed to said electron collector reflect in a direction of said electron emitter.

16. A solar energy converter as claimed in one of claims 1 to 4, wherein said electron collector is provided on a lower surface of said light-concentrating instrument and below said electron accelerator, and the lower surface of said light-concentrating instrument is formed into a curved surface which inclines toward said electron collector.

17. A solar energy conversion system, wherein said solar energy converter as claimed in one of claims 1 to 4 is used as a unit, and a plurality of the solar energy converters are connected in series or in parallel to make a set of solar energy converters.

* * * * *